United States Patent
Yi et al.

(10) Patent No.: US 11,109,364 B2
(45) Date of Patent: Aug. 31, 2021

(54) METHOD AND APPARATUS FOR CONFIGURING PUCCH RESOURCE IN WIRELESS COMMUNICATION SYSTEM

(71) Applicant: LG Electronics Inc., Seoul (KR)

(72) Inventors: Yunjung Yi, Seoul (KR); Suckchel Yang, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/491,213

(22) PCT Filed: May 9, 2019

(86) PCT No.: PCT/KR2019/005535
§ 371 (c)(1),
(2) Date: Sep. 5, 2019

(87) PCT Pub. No.: WO2019/216654
PCT Pub. Date: Nov. 14, 2019

(65) Prior Publication Data
US 2020/0178239 A1  Jun. 4, 2020

Related U.S. Application Data

(60) Provisional application No. 62/669,968, filed on May 10, 2018, provisional application No. 62/672,038, filed on May 15, 2018.

(51) Int. Cl.
*H04W 72/04* (2009.01)
*H04W 76/27* (2018.01)
(Continued)

(52) U.S. Cl.
CPC ....... *H04W 72/0413* (2013.01); *H04L 1/1812* (2013.01); *H04L 5/0055* (2013.01);
(Continued)

(58) Field of Classification Search
None
See application file for complete search history.

(56) References Cited

U.S. PATENT DOCUMENTS

2009/0163217 A1* 6/2009 Xu .................. H04W 76/10
455/450
2011/0007698 A1* 1/2011 Sagfors ............. H04W 28/18
370/329

(Continued)

FOREIGN PATENT DOCUMENTS

TW 201804753 A 2/2018
WO 2018030856 2/2018

OTHER PUBLICATIONS

Samsung, "Correction on Resource Allocation for PUCCH," R1-1800450, 3GPP TSG RAN WG1 #AH 1801, Vancouver, Canada, Jan. 13, 2018, sections 2.1-2.2.

(Continued)

*Primary Examiner* — Bunjob Jaroenchonwanit
(74) *Attorney, Agent, or Firm* — Dentons US LLP

(57) ABSTRACT

Provided herein is a method and apparatus for configuring a physical uplink control channel (PUCCH) resource in a wireless communication system and, most particularly, in a new radio access (NR) technology. More specifically, when and/or for which operation the default PUCCH resource is being used may be defined. For example, a wireless device may receive information on a default physical uplink control channel (PUCCH) resource, and the wireless device may transmit uplink control information (UCI) to a gNB by using the default PUCCH resource, only before establishing a radio resource control (RRC) connection with the gNB.

11 Claims, 13 Drawing Sheets

(51) Int. Cl.
*H04L 1/18* (2006.01)
*H04L 5/00* (2006.01)
*H04W 16/28* (2009.01)
*H04W 72/12* (2009.01)
*H04W 74/08* (2009.01)

(52) U.S. Cl.
CPC ......... *H04W 16/28* (2013.01); *H04W 72/042* (2013.01); *H04W 72/1284* (2013.01); *H04W 74/0833* (2013.01); *H04W 76/27* (2018.02)

(56) References Cited

U.S. PATENT DOCUMENTS

| | | | | |
|---|---|---|---|---|
| 2013/0083739 | A1* | 4/2013 | Yamada | H04W 74/006 370/329 |
| 2015/0195854 | A1* | 7/2015 | Zhu | H04W 74/08 370/329 |
| 2016/0100422 | A1* | 4/2016 | Papasakellariou | H04L 1/1861 370/329 |
| 2017/0105112 | A1* | 4/2017 | Park | H04W 8/005 |
| 2017/0105198 | A1* | 4/2017 | Fu | H04L 1/1822 |
| 2017/0188352 | A1 | 6/2017 | Lee et al. | |
| 2017/0339567 | A1* | 11/2017 | Li | H04W 16/02 |
| 2018/0062724 | A1 | 3/2018 | Onggosanusi et al. | |
| 2018/0324786 | A1* | 11/2018 | Hooli | H04L 5/0053 |
| 2019/0036653 | A1* | 1/2019 | Lunttila | H04W 36/0005 |
| 2019/0103947 | A1* | 4/2019 | Park | H04L 1/1896 |
| 2019/0115955 | A1* | 4/2019 | John Wilson | H04L 5/0048 |
| 2019/0141594 | A1* | 5/2019 | Jeong | H04W 28/08 |
| 2019/0149271 | A1* | 5/2019 | Yin | H04L 1/1816 370/329 |
| 2019/0149365 | A1* | 5/2019 | Chatterjee | H04L 5/0092 370/329 |
| 2019/0199420 | A1* | 6/2019 | Faxer | H04B 7/0632 |
| 2019/0215701 | A1* | 7/2019 | Honglei | H04L 1/1848 |
| 2019/0223085 | A1* | 7/2019 | Wang | H04W 72/1273 |
| 2019/0239286 | A1* | 8/2019 | Chang | H04L 5/0094 |
| 2019/0253298 | A1* | 8/2019 | Moroga | H04W 72/12 |
| 2019/0260484 | A1* | 8/2019 | Nam | H04W 24/02 |
| 2019/0268118 | A1* | 8/2019 | Sadiq | H04L 41/0813 |
| 2019/0268961 | A1* | 8/2019 | Tsai | H04W 74/0833 |
| 2019/0297547 | A1* | 9/2019 | Tsai | H04L 5/0048 |
| 2019/0306867 | A1* | 10/2019 | Cirik | H04W 74/006 |
| 2019/0312698 | A1* | 10/2019 | Akkarakaran | H04W 72/046 |
| 2019/0313437 | A1* | 10/2019 | Jung | H04L 5/0053 |
| 2019/0320469 | A1* | 10/2019 | Huang | H04L 5/0053 |
| 2019/0327743 | A1* | 10/2019 | Shi | H04L 5/0055 |
| 2019/0335524 | A1* | 10/2019 | Wang | H04L 5/0048 |
| 2019/0342936 | A1* | 11/2019 | Wu | H04W 72/042 |
| 2019/0349125 | A1* | 11/2019 | Gao | H04L 5/0053 |
| 2019/0387453 | A1* | 12/2019 | Pelletier | H04W 88/06 |
| 2020/0008103 | A1* | 1/2020 | Lin | H04W 72/0413 |
| 2020/0014517 | A1* | 1/2020 | Takeda | H04L 5/0053 |
| 2020/0052835 | A1* | 2/2020 | Xiong | H04L 1/1861 |
| 2020/0052837 | A1* | 2/2020 | Zhang | H04B 7/0626 |
| 2020/0077386 | A1* | 3/2020 | Papasakellariou | H04L 1/18 |
| 2020/0084762 | A1* | 3/2020 | Gou | H04B 7/088 |
| 2020/0092876 | A1* | 3/2020 | Cho | H04W 72/0413 |
| 2020/0092905 | A1* | 3/2020 | Vos | H04W 76/27 |
| 2020/0100276 | A1* | 3/2020 | Oh | H04L 5/0007 |
| 2020/0154467 | A1* | 5/2020 | Gong | H04W 24/08 |
| 2020/0154489 | A1* | 5/2020 | Zhou | H04W 72/042 |
| 2020/0204247 | A1* | 6/2020 | Zhou | H04L 5/0044 |
| 2020/0221444 | A1* | 7/2020 | Tiirola | H04L 1/1812 |
| 2020/0236705 | A1* | 7/2020 | Marinier | H04W 74/006 |
| 2020/0259625 | A1* | 8/2020 | Papasakellariou | H04B 7/063 |
| 2020/0296715 | A1* | 9/2020 | Wang | H04L 1/1854 |
| 2020/0305168 | A1* | 9/2020 | Liou | H04W 72/042 |
| 2020/0314860 | A1* | 10/2020 | Zhou | H04W 72/14 |
| 2020/0329395 | A1* | 10/2020 | Pezeshki | H04W 24/10 |

OTHER PUBLICATIONS

Huawei, "Remaining Issues on Beam Management," R1-1801453, 3GPP TSG WG1 Meeting #92, Athens, Greece, Feb. 16, 2018, Section 3.3.
Ericsson, "Feature Lead Summary on Beam Measurement and Reporting," R1-1805514, 3GPP TSG RAN WG1 Meeting #92b, Sanya, China, Apr. 18, 2018, sections 3.1-3.8.
3GPP TS 38.214 V15.1.0, Mar. 2018, pp. 19-20.
3GPP TS 38.213 V15.1.0, Mar. 2018, pp. 40-41.
CATT: "Remaining details on beam management", R1-1803744, 3GPP TSG RAN WG1 Meeting #92bis, Sanya, China, Apr. 16-20, 2018.
NTT Docomo: "Remaining issues on beam management", R1-1805041, 3GPP TSG RAN WG1 Meeting #92bis, Sanya, China, Apr. 16-20, 2018.
Ericsson: "Feature lead summary 2 on beam measurement and reporting", R1-1805574, 3GPP TSG RAN WG1 Meeting #92b, Sanya, China, Apr. 16-20, 2018.
3GPP TS 38.300 V15.1.0, "Technical Specification Group Radio Access Network; NR; NR and NG-RAN Overall Description; Stage 2 (Release 15)", Mar. 2018, pp. 20, 25 and 32.
R1-1805742:3GPP TSG RAN WG1 Meeting #92bis, Sanya, China, Apr. 16-20, 2018, "Summary of offline discussion on PUCCH resource allocation," OPPO, (10 Pages).
R1-1805189:3GPP TSG-RAN WG1 #92bis, Sanya, China, Apr. 16-20, 2018, "On remaining issues of scheduling and HARQ management" Ericsson, (8 Pages).
R1-1807625: 3GPP TSG-RAN WG1 Meeting #93, Busan, May 21-25, 2018, "Feature lead summary 1 for beam measurement and reporting," Ericsson, (32 Pages).

* cited by examiner

METHOD AND APPARATUS FOR CONFIGURING PUCCH RESOURCE IN WIRELESS COMMUNICATION SYSTEM

This application is the National Stage filing under 35 U.S.C. 371 of International Application No. PCT/KR2019/005535, filed on May 9, 2019, which claims the benefit of U.S. Provisional Applications No. 62/669,968 filed on May 10, 2018 and No. 62/672,038 filed on May 15, 2018, the contents of which are all hereby incorporated by reference herein in their entirety.

BACKGROUND OF THE INVENTION

Field of the Invention

The present invention relates to wireless communication and, most particularly, to a method and apparatus for configuring physical uplink control channel (PUCCH) resource in a wireless communication system and, most particularly, in a new radio access (NR) technology.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY OF THE INVENTION

In the NR, a default (or common) physical uplink control channel (PUCCH) resource and a UE-dedicated PUCCH resource may be configured. Herein, when and/or for which operation the default PUCCH resource is being used needs to be specifically defined.

The present invention discusses a PUCCH resource configuration in case of a BWP operation. More specifically, the present invention describes a method for configuring a PUCCH resource and related quasi co-location (QCL)/transmission configuration indicator (TCI) states for supporting a random access channel (RACH) procedure and fallback operations.

In an aspect, a method performed by a wireless device in a wireless communication system is provided. The method includes receiving information on a default physical uplink control channel (PUCCH) resource, and transmitting uplink control information (UCI) to a gNB by using the default PUCCH resource, only before establishing a radio resource control (RRC) connection with the gNB.

In another aspect, a wireless device in a wireless communication system is provided. The wireless device includes a memory, a transceiver, and a processor being operatively connected to the memory and the transceiver. The wireless device is configured to receive information on a default physical uplink control channel (PUCCH) resource via the transceiver, and transmit uplink control information (UCI) to a gNB by using the default PUCCH resource via the transceiver, only before establishing a radio resource control (RRC) connection with the gNB.

In another aspect, a processor for a wireless device in a wireless communication system is provided. The processor is configured to control the wireless device so as to receive information on a default physical uplink control channel (PUCCH) resource, and control the wireless device so as to transmit uplink control information (UCI) to a gNB by using the default PUCCH resource, only before establishing a radio resource control (RRC) connection with the gNB.

When and/or for which operation a default PUCCH resource is being used can be clearly defined.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
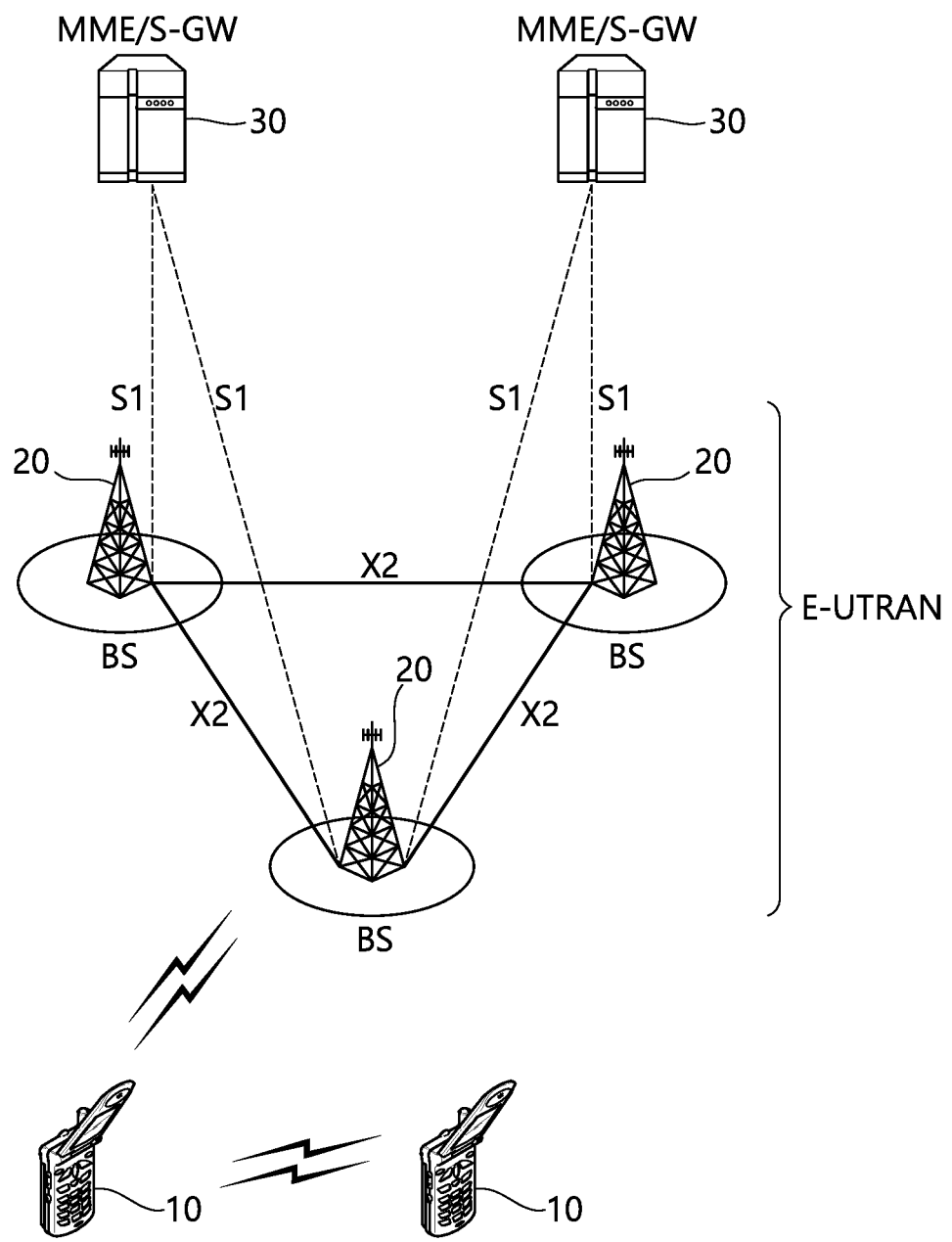
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (RRM), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
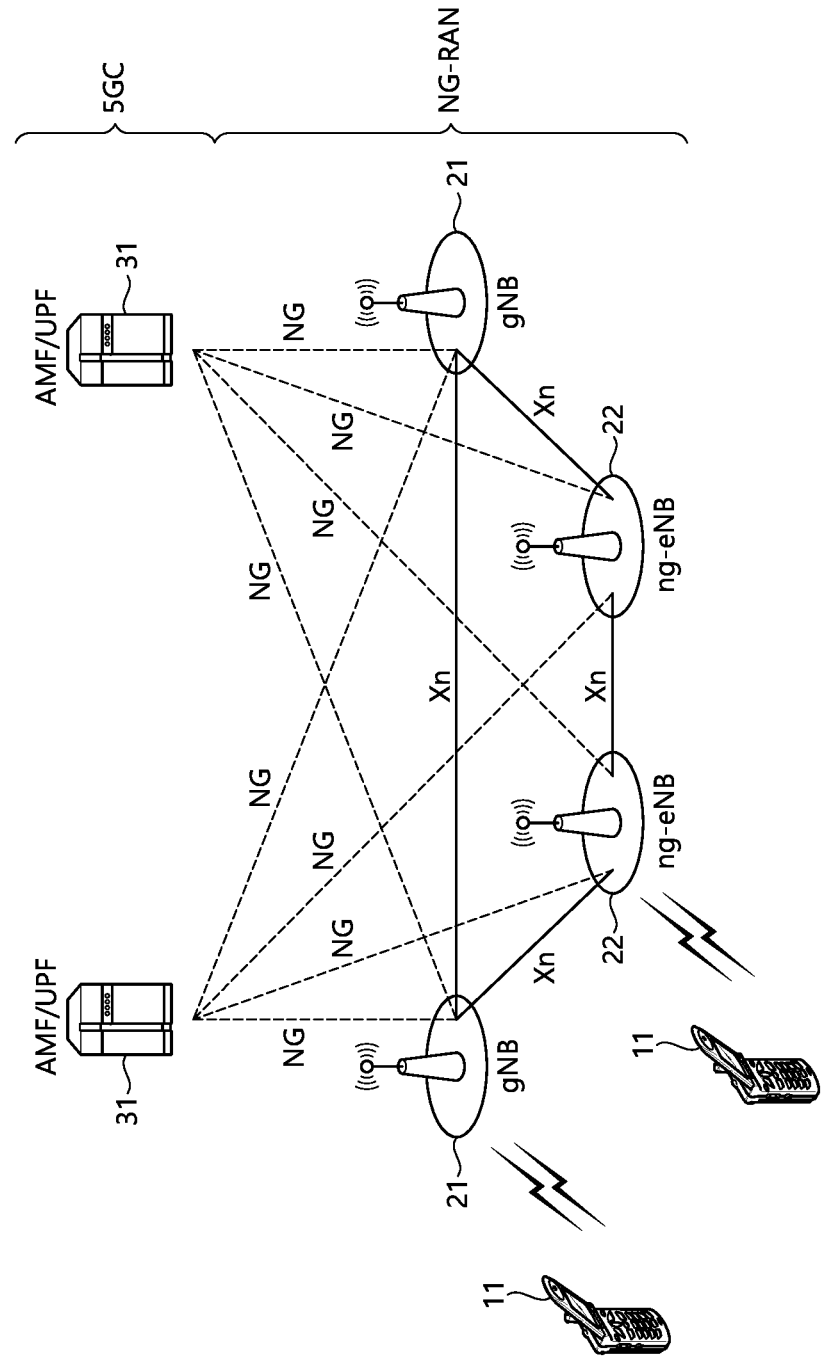
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE.

In the following description, for NR, 3GPP TS 38 series (3GPP TS 38.211, 38.212, 38.213, 38.214, 38.331, etc.) can be referred to in order to facilitate understanding of the following description.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 20 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

Hereinafter, frame structure/physical resources in NR is described.

In LTE/LTE-A, one radio frame consists of 10 subframes, and one subframe consists of 2 slots. A length of one subframe may be 1 ms, and a length of one slot may be 0.5 ms. Time for transmitting one transport block by higher layer to physical layer (generally over one subframe) is defined as a transmission time interval (TTI). A TTI may be the minimum unit of scheduling.

In NR, DL and UL transmissions are performed over a radio frame with a duration of 10 ms. Each radio frame includes 10 subframes. Thus, one subframe corresponds to 1 ms. Each radio frame is divided into two half-frames.

Unlike LTE/LTE-A, NR supports various numerologies, and accordingly, the structure of the radio frame may be varied. NR supports multiple subcarrier spacings in frequency domain. Table 1 shows multiple numerologies supported in NR. Each numerology may be identified by index $\mu$.

TABLE 1

| $\mu$ | Subcarrier spacing (kHz) | Cyclic prefix | Supported for data | Supported for synchronization |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Referring to Table 1, a subcarrier spacing may be set to any one of 15, 30, 60, 120, and 240 kHz, which is identified by index $\mu$. However, subcarrier spacings shown in Table 1 are merely exemplary, and specific subcarrier spacings may be changed. Therefore, each subcarrier spacing (e.g. $\mu$=0, 1 . . . 4) may be represented as a first subcarrier spacing, a second subcarrier spacing . . . Nth subcarrier spacing.

Referring to Table 1, transmission of user data (e.g. physical uplink shared channel (PUSCH), physical downlink shared channel (PDSCH)) may not be supported depending on the subcarrier spacing. That is, transmission of user data may not be supported only in at least one specific subcarrier spacing (e.g. 240 kHz).

In addition, referring to Table 1, a synchronization channel (e.g. a primary synchronization signal (PSS), a secondary synchronization signal (SSS), a physical broadcast channel (PBCH)) may not be supported depending on the subcarrier spacing. That is, the synchronization channel may not be supported only in at least one specific subcarrier spacing (e.g. 60 kHz).

One subframe includes $N_{symb}^{subframe,\mu} = N_{symb}^{slot} * N_{slot}^{subframe,\mu}$ consecutive OFDM symbols. In NR, a number of slots and a number of symbols included in one radio frame/subframe may be different according to various numerologies, i.e. various subcarrier spacings.

Table 2 shows an example of a number of OFDM symbols per slot ($N_{symb}^{slot}$), a number of slots per radio frame ($N_{symb}^{frame,\mu}$), and a number of slots per subframe ($N_{symb}^{subframe,\mu}$) for each numerology in normal cyclic prefix (CP).

TABLE 2

| $\mu$ | Number of OFDM symbols per slot ($N_{symb}^{slot}$) | Number of slots per radio frame ($N_{symb}^{frame,\mu}$) | Number of slots per subframe ($N_{symb}^{subframe,\mu}$) |
|---|---|---|---|
| 0 | 14 | 10 | 1 |
| 1 | 14 | 20 | 2 |

TABLE 2-continued

| $\mu$ | Number of OFDM symbols per slot ($N_{symb}^{slot}$) | Number of slots per radio frame ($N_{symb}^{frame,\mu}$) | Number of slots per subframe ($N_{symb}^{subframe,\mu}$) |
|---|---|---|---|
| 2 | 14 | 40 | 4 |
| 3 | 14 | 80 | 8 |
| 4 | 14 | 160 | 16 |

Referring to Table 2, when a first numerology corresponding to $\mu$=0 is applied, one radio frame includes 10 subframes, one subframe includes to one slot, and one slot consists of 14 symbols.

Table 3 shows an example of a number of OFDM symbols per slot ($N_{symb}^{slot}$), a number of slots per radio frame ($N_{symb}^{frame,\mu}$), and a number of slots per subframe ($N_{symb}^{subframe,\mu}$) for each numerology in extended CP.

TABLE 3

| $\mu$ | Number of OFDM symbols per slot ($N_{symb}^{slot}$) | Number of slots per radio frame ($N_{symb}^{frame,\mu}$) | Number of slots per subframe ($N_{symb}^{subframe,\mu}$) |
|---|---|---|---|
| 2 | 12 | 40 | 4 |

Referring to Table 3, $\mu$=2 is only supported in extended CP. One radio frame includes 10 subframes, one subframe includes to 4 slots, and one slot consists of 12 symbols.

In the present specification, a symbol refers to a signal transmitted during a specific time interval. For example, a symbol may refer to a signal generated by OFDM processing. That is, a symbol in the present specification may refer to an OFDM/OFDMA symbol, or SC-FDMA symbol, etc. A CP may be located between each symbol.

Figure 3:
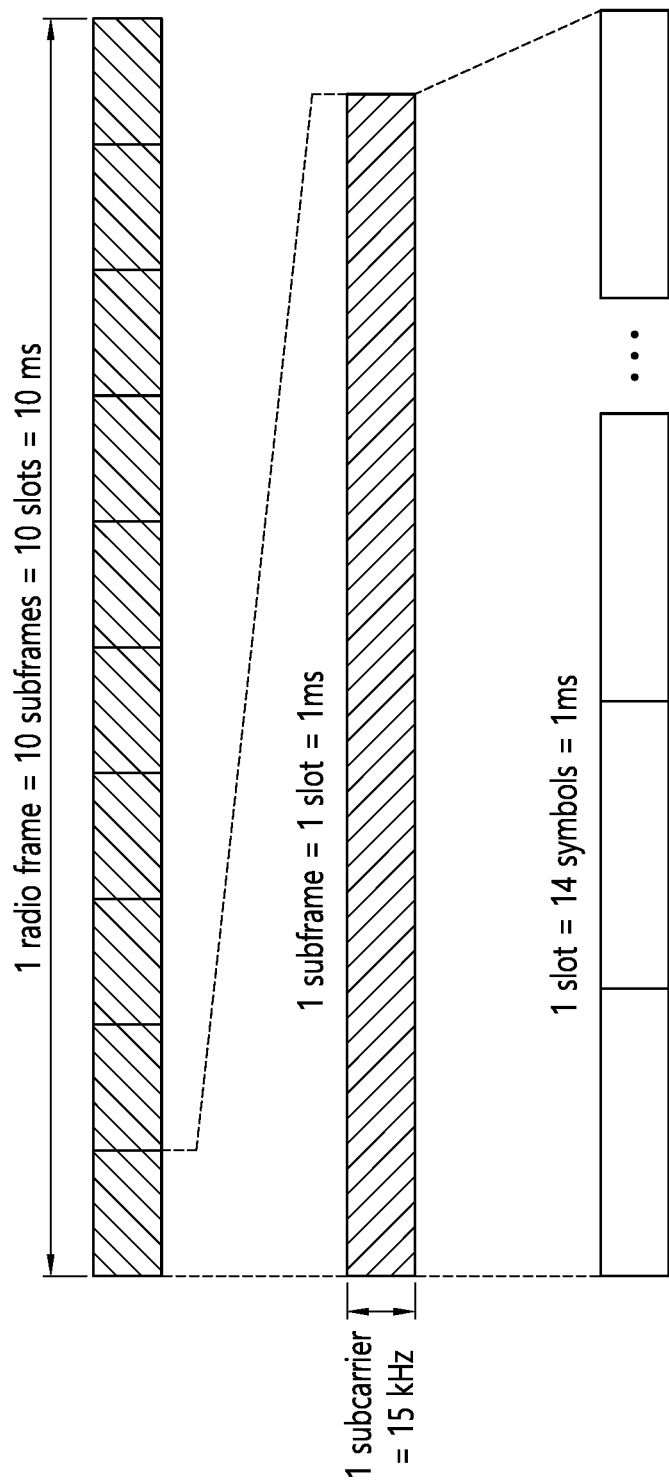
FIG. 3 shows an example of a frame structure to which technical features of the present invention can be applied.

FIG. 3 shows an example of a frame structure to which technical features of the present invention can be applied. In FIG. 3, a subcarrier spacing is 15 kHz, which corresponds to $\mu$=0.

Figure 4:
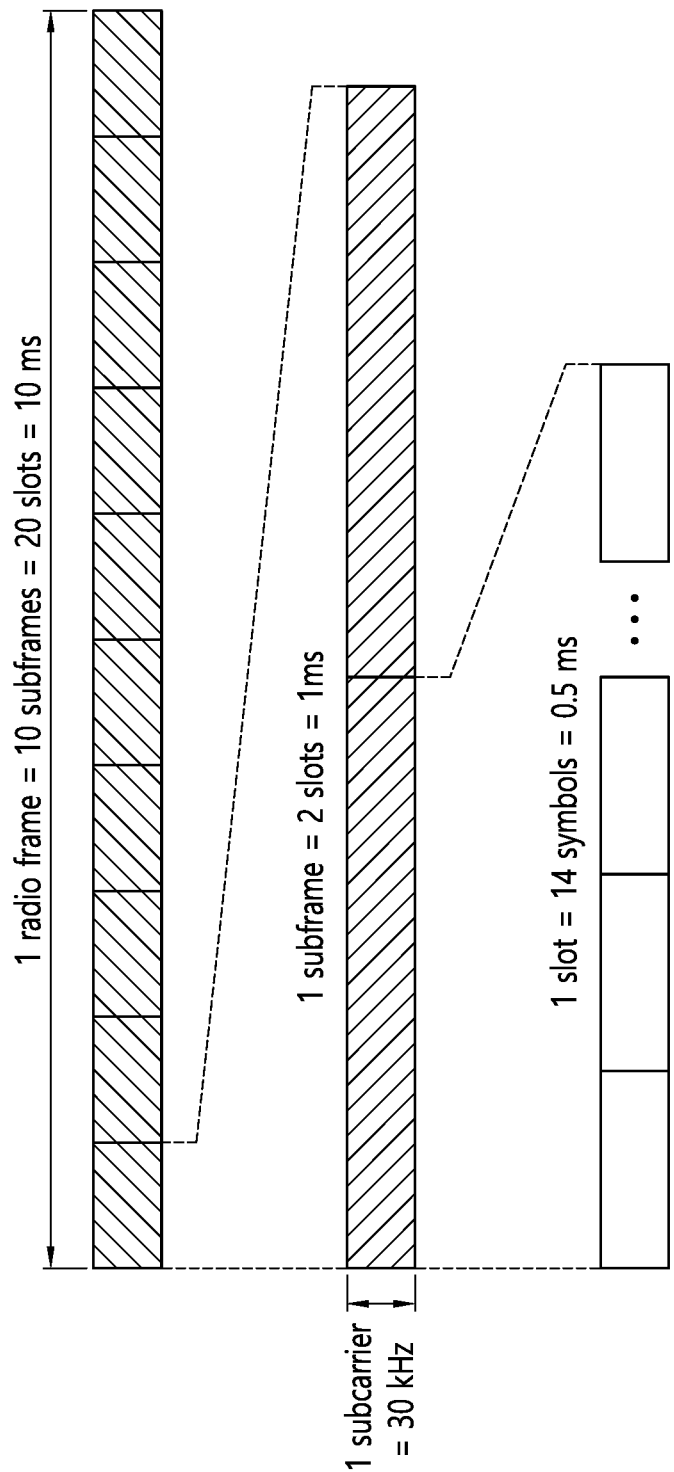
FIG. 4 shows another example of a frame structure to which technical features of the present invention can be applied.

FIG. 4 shows another example of a frame structure to which technical features of the present invention can be applied. In FIG. 4, a subcarrier spacing is 30 kHz, which corresponds to $\mu$=1.

Meanwhile, a frequency division duplex (FDD) and/or a time division duplex (TDD) may be applied to a wireless communication system to which an embodiment of the present invention is applied. When TDD is applied, in LTE/LTE-A, UL subframes and DL subframes are allocated in units of subframes.

In NR, symbols in a slot may be classified as a DL symbol (denoted by D), a flexible symbol (denoted by X), and a UL symbol (denoted by U). In a slot in a DL frame, the UE shall assume that DL transmissions only occur in DL symbols or flexible symbols. In a slot in an UL frame, the UE shall only transmit in UL symbols or flexible symbols. The flexible symbol may be referred to as another terminology, such as reserved symbol, other symbol, unknown symbol, etc.

Table 4 shows an example of a slot format which is identified by a corresponding format index. The contents of the Table 4 may be commonly applied to a specific cell, or may be commonly applied to adjacent cells, or may be applied individually or differently to each UE.

TABLE 4

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| ... | | | | | | | | | | | | | | |

For convenience of explanation, Table 4 shows only a part of the slot format actually defined in NR. The specific allocation scheme may be changed or added.

The UE may receive a slot format configuration via a higher layer signaling (i.e. radio resource control (RRC) signaling). Or, the UE may receive a slot format configuration via downlink control information (DCI) which is received on PDCCH. Or, the UE may receive a slot format configuration via combination of higher layer signaling and DCI.

Figure 5:
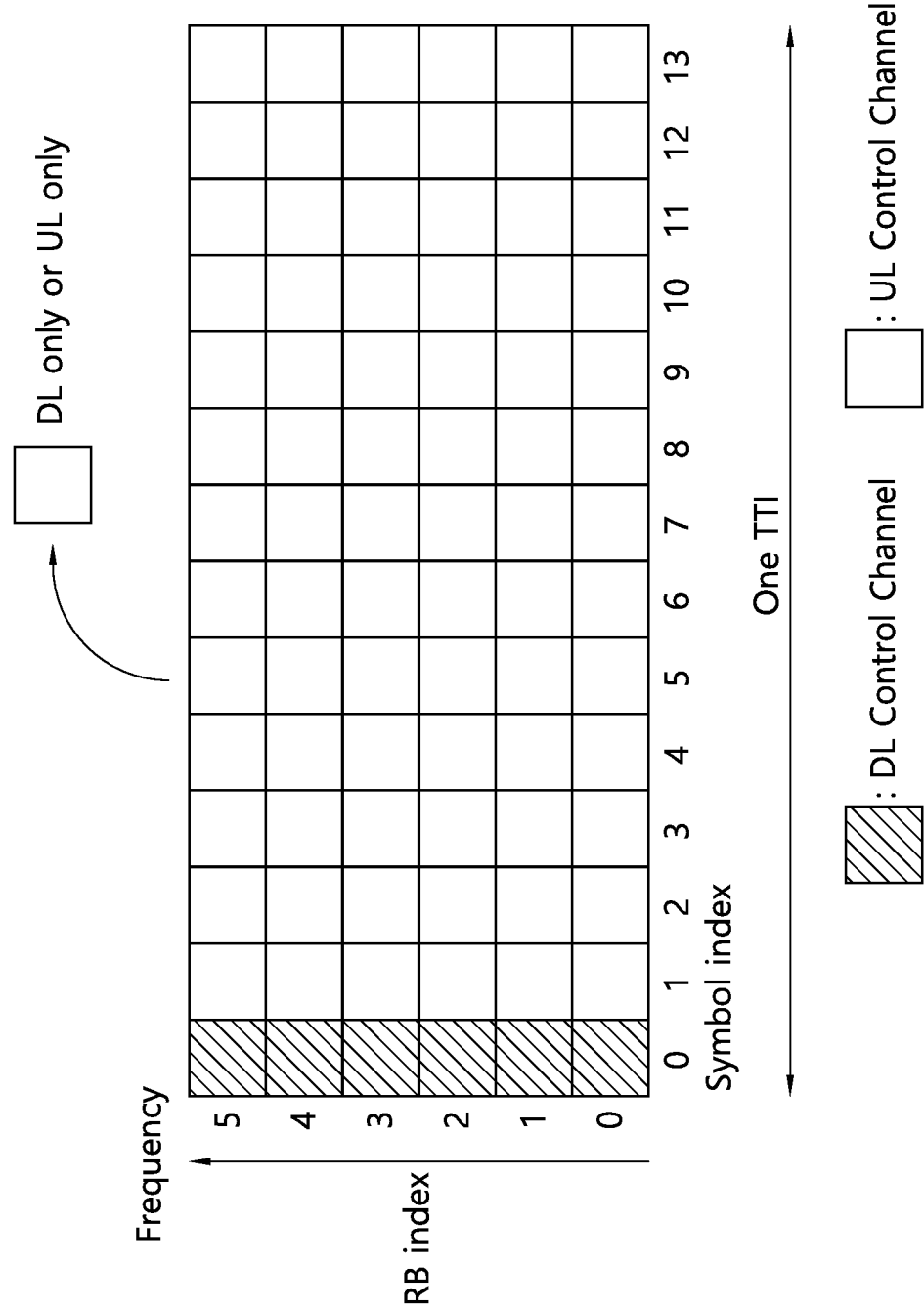
FIG. 5 shows an example of a subframe structure used to minimize latency of data transmission when TDD is used in NR.

FIG. 5 shows an example of a subframe structure used to minimize latency of data transmission when TDD is used in NR. The subframe structure shown in FIG. 5 may be called a self-contained subframe structure.

Referring to FIG. 5, the subframe includes DL control channel in the first symbol, and UL control channel in the last symbol. The remaining symbols may be used for DL data transmission and/or for UL data transmission. According to this subframe structure, DL transmission and UL transmission may sequentially proceed in one subframe. Accordingly, the UE may both receive DL data and transmit UL acknowledgement/non-acknowledgement (ACK/NACK) in the subframe. As a result, it may take less time to retransmit data when a data transmission error occurs, thereby minimizing the latency of final data transmission.

In the self-contained subframe structure, a time gap may be required for the transition process from the transmission mode to the reception mode or from the reception mode to the transmission mode. For this purpose, some symbols at the time of switching from DL to UL in the subframe structure may be set to the guard period (GP).

Figure 6:
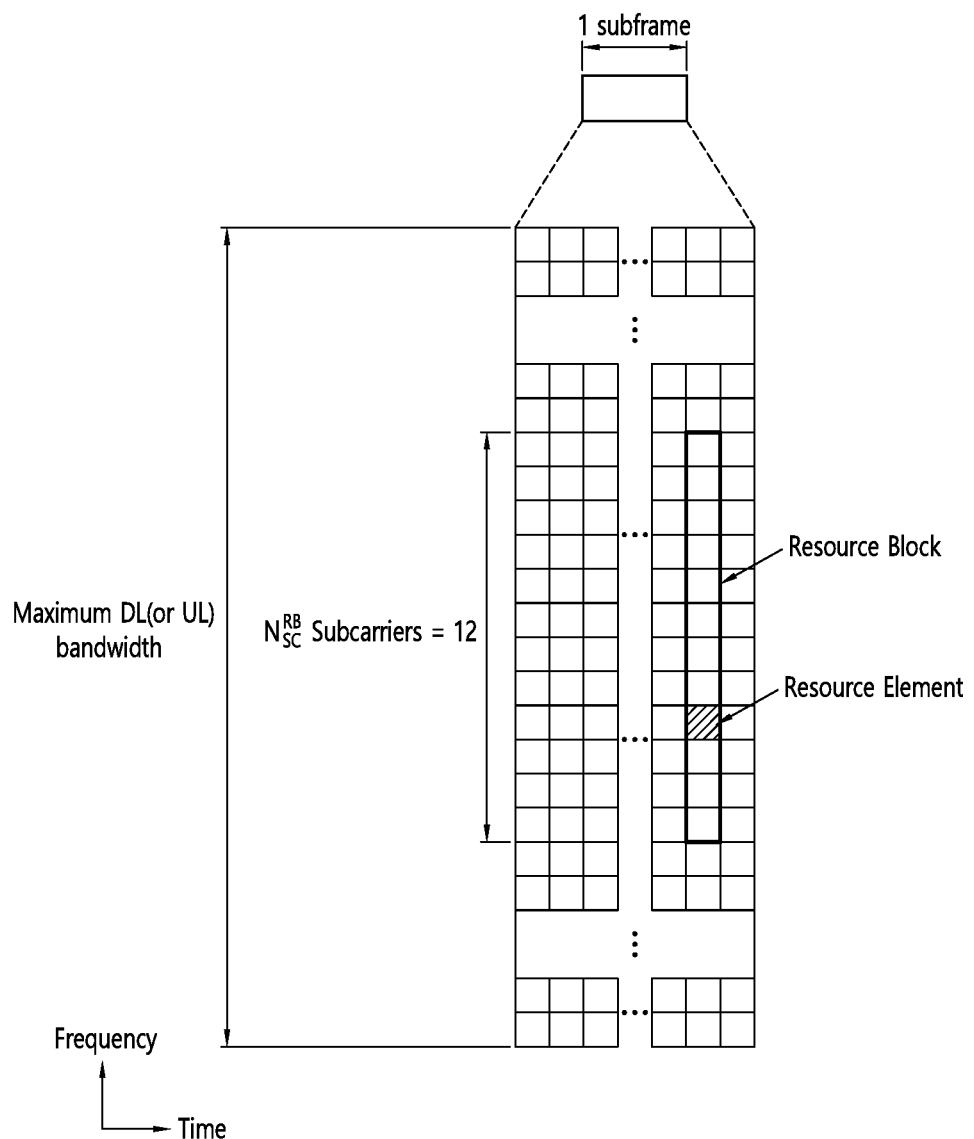
FIG. 6 shows an example of a resource grid to which technical features of the present invention can be applied.

FIG. 6 shows an example of a resource grid to which technical features of the present invention can be applied. An example shown in FIG. 6 is a time-frequency resource grid used in NR. An example shown in FIG. 6 may be applied to UL and/or DL.

Referring to FIG. 6, multiple slots are included within one subframe on the time domain. Specifically, when expressed according to the value of "µ", "14·2µ" symbols may be expressed in the resource grid. Also, one resource block (RB) may occupy 12 consecutive subcarriers. One RB may be referred to as a physical resource block (PRB), and 12 resource elements (REs) may be included in each PRB. The number of allocatable RBs may be determined based on a minimum value and a maximum value. The number of allocatable RBs may be configured individually according to the numerology ("µ"). The number of allocatable RBs may be configured to the same value for UL and DL, or may be configured to different values for UL and DL.

Hereinafter, a cell search in NR is described.

The UE may perform cell search in order to acquire time and/or frequency synchronization with a cell and to acquire a cell identifier (ID). Synchronization channels such as PSS, SSS, and PBCH may be used for cell search.

Figure 7:
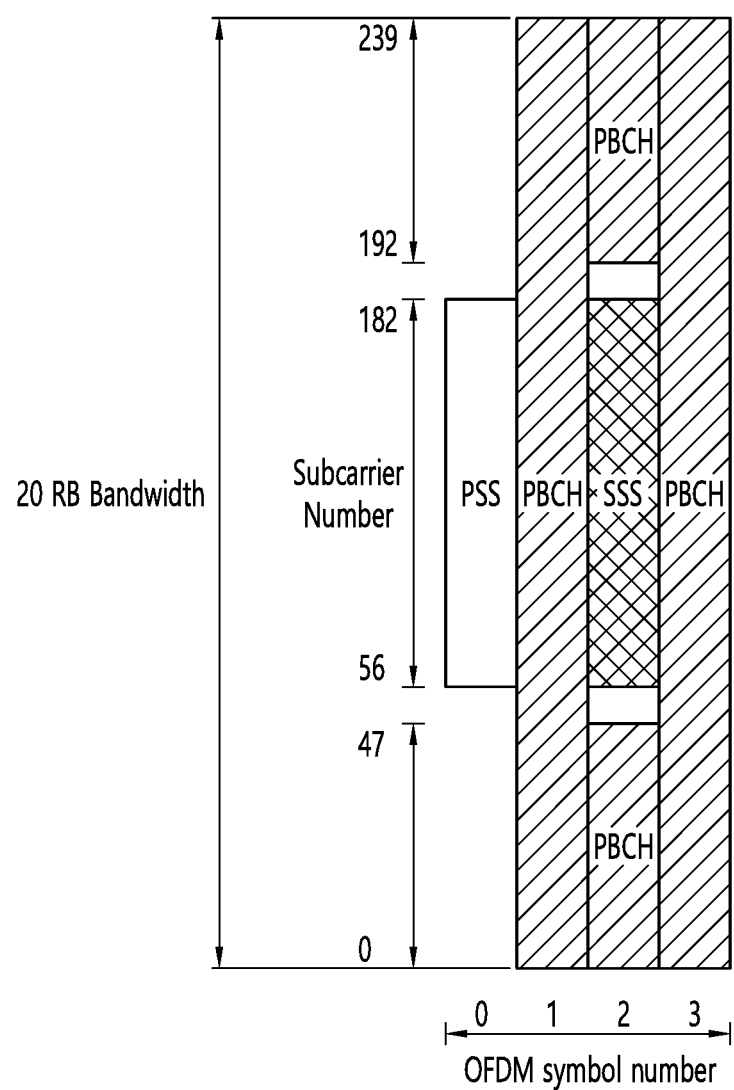
FIG. 7 shows an example of a synchronization channel to which technical features of the present invention can be applied.

FIG. 7 shows an example of a synchronization channel to which technical features of the present invention can be applied. Referring to FIG. 7, the PSS and SSS may include one symbol and 127 subcarriers. The PBCH may include 3 symbols and 240 subcarriers.

The PSS is used for synchronization signal (SS)/PBCH block symbol timing acquisition. The PSS indicates 3 hypotheses for cell ID identification. The SSS is used for cell ID identification. The SSS indicates 336 hypotheses. Consequently, 1008 physical layer cell IDs may be configured by the PSS and the SSS.

The SS/PBCH block may be repeatedly transmitted according to a predetermined pattern within the 5 ms window. For example, when L SS/PBCH blocks are transmitted, all of SS/PBCH block #1 through SS/PBCH block #L may contain the same information, but may be transmitted through beams in different directions. That is, quasi co-located (QCL) relationship may not be applied to the SS/PBCH blocks within the 5 ms window. The beams used to receive the SS/PBCH block may be used in subsequent operations between the UE and the network (e.g. random access operations). The SS/PBCH block may be repeated by a specific period. The repetition period may be configured individually according to the numerology.

Referring to FIG. 7, the PBCH has a bandwidth of 20 RBs for the 2nd/4th symbols and 8 RBs for the 3rd symbol. The PBCH includes a demodulation reference signal (DM-RS) for decoding the PBCH. The frequency domain for the DM-RS is determined according to the cell ID. Unlike LTE/LTE-A, since a cell-specific reference signal (CRS) is not defined in NR, a special DM-RS is defined for decoding the PBCH (i.e. PBCH-DMRS). The PBCH-DMRS may contain information indicating an SS/PBCH block index.

The PBCH performs various functions. For example, the PBCH may perform a function of broadcasting a master information block (MIB). System information (SI) is divided into a minimum SI and other SI. The minimum SI may be divided into MIB and system information block type-1 (SIB1). The minimum SI excluding the MIB may be referred to as a remaining minimum SI (RMSI). That is, the RMSI may refer to the SIB1.

The MIB includes information necessary for decoding SIB1. For example, the MIB may include information on a subcarrier spacing applied to SIB1 (and MSG 2/4 used in the random access procedure, other SI), information on a frequency offset between the SS/PBCH block and the subsequently transmitted RB, information on a bandwidth of the PDCCH/SIB, and information for decoding the PDCCH (e.g. information on search-space/control resource set (CORESET)/DM-RS, etc., which will be described later). The MIB may be periodically transmitted, and the same information may be repeatedly transmitted during 80 ms time interval. The SIB1 may be repeatedly transmitted through the PDSCH. The SIB1 includes control information for initial access of the UE and information for decoding another SIB.

Hereinafter, DL control channel in NR is described.

The search space for the PDCCH corresponds to aggregation of control channel candidates on which the UE performs blind decoding. In LTE/LTE-A, the search space for the PDCCH is divided into a common search space (CSS) and a UE-specific search space (USS). The size of each search space and/or the size of a control channel element (CCE) included in the PDCCH are determined according to the PDCCH format.

In NR, a resource-element group (REG) and a CCE for the PDCCH are defined. In NR, the concept of CORESET is defined. Specifically, one REG corresponds to 12 REs, i.e. one RB transmitted through one OFDM symbol. Each REG includes a DM-RS. One CCE includes a plurality of REGs (e.g. 6 REGs). The PDCCH may be transmitted through a resource consisting of 1, 2, 4, 8, or 16 CCEs. The number of CCEs may be determined according to the aggregation level. That is, one CCE when the aggregation level is 1, 2 CCEs when the aggregation level is 2, 4 CCEs when the aggregation level is 4, 8 CCEs when the aggregation level is 8, 16 CCEs when the aggregation level is 16, may be included in the PDCCH for a specific UE.

The CORESET is a set of resources for control signal transmission. The CORESET may be defined on 1/2/3 OFDM symbols and multiple RBs. In LTE/LTE-A, the number of symbols used for the PDCCH is defined by a physical control format indicator channel (PCFICH). However, the PCFICH is not used in NR. Instead, the number of symbols used for the CORESET may be defined by the RRC message (and/or PBCH/SIB1). Also, in LTE/LTE-A, since the frequency bandwidth of the PDCCH is the same as the entire system bandwidth, so there is no signaling regarding the frequency bandwidth of the PDCCH. In NR, the frequency domain of the CORESET may be defined by the RRC message (and/or PBCH/SIB1) in a unit of RB.

The base station may transmit information on the CORESET to the UE. For example, information on the CORESET configuration may be transmitted for each CORESET. Via the information on the CORESET configuration, at least one of a time duration of the corresponding CORESET (e.g. 1/2/3 symbol), frequency domain resources (e.g. RB set), REG-to-CCE mapping type (e.g. whether interleaving is applied or not), precoding granularity, a REG bundling size (when the REG-to-CCE mapping type is interleaving), an interleaver size (when the REG-to-CCE mapping type is interleaving) and a DMRS configuration (e.g. scrambling ID) may be transmitted. When interleaving to distribute the CCE to 1-symbol CORESET is applied, bundling of two or six REGs may be performed. Bundling of two or six REGs may be performed on the two symbols CORESET, and time first mapping may be applied. Bundling of three or six REGs may be performed on the three symbols CORESET, and a time first mapping may be applied. When REG bundling is performed, the UE may assume the same precoding for the corresponding bundling unit.

In NR, the search space for the PDCCH is divided into CSS and USS. The search space may be configured in CORESET. As an example, one search space may be defined in one CORESET. In this case, CORESET for CSS and CORESET for USS may be configured, respectively. As another example, a plurality of search spaces may be defined in one CORESET. That is, CSS and USS may be configured in the same CORESET. In the following example, CSS means CORESET in which CSS is configured, and USS means CORESET in which USS is configured. Since the USS may be indicated by the RRC message, an RRC connection may be required for the UE to decode the USS. The USS may include control information for PDSCH decoding assigned to the UE.

Since the PDCCH needs to be decoded even when the RRC configuration is not completed, CSS should also be defined. For example, CSS may be defined when a PDCCH for decoding a PDSCH that conveys SIB1 is configured or when a PDCCH for receiving MSG 2/4 is configured in a random access procedure. Like LTE/LTE-A, in NR, the PDCCH may be scrambled by a radio network temporary identifier (RNTI) for a specific purpose.

A resource allocation in NR is described.

In NR, a specific number (e.g. up to 4) of bandwidth parts (BWPs) may be defined. A BWP (or carrier BWP) is a set of consecutive PRBs, and may be represented by a consecutive subsets of common RBs (CRBs). Each RB in the CRB may be represented by CRB1, CRB2, etc., beginning with CRB0.

Figure 8:
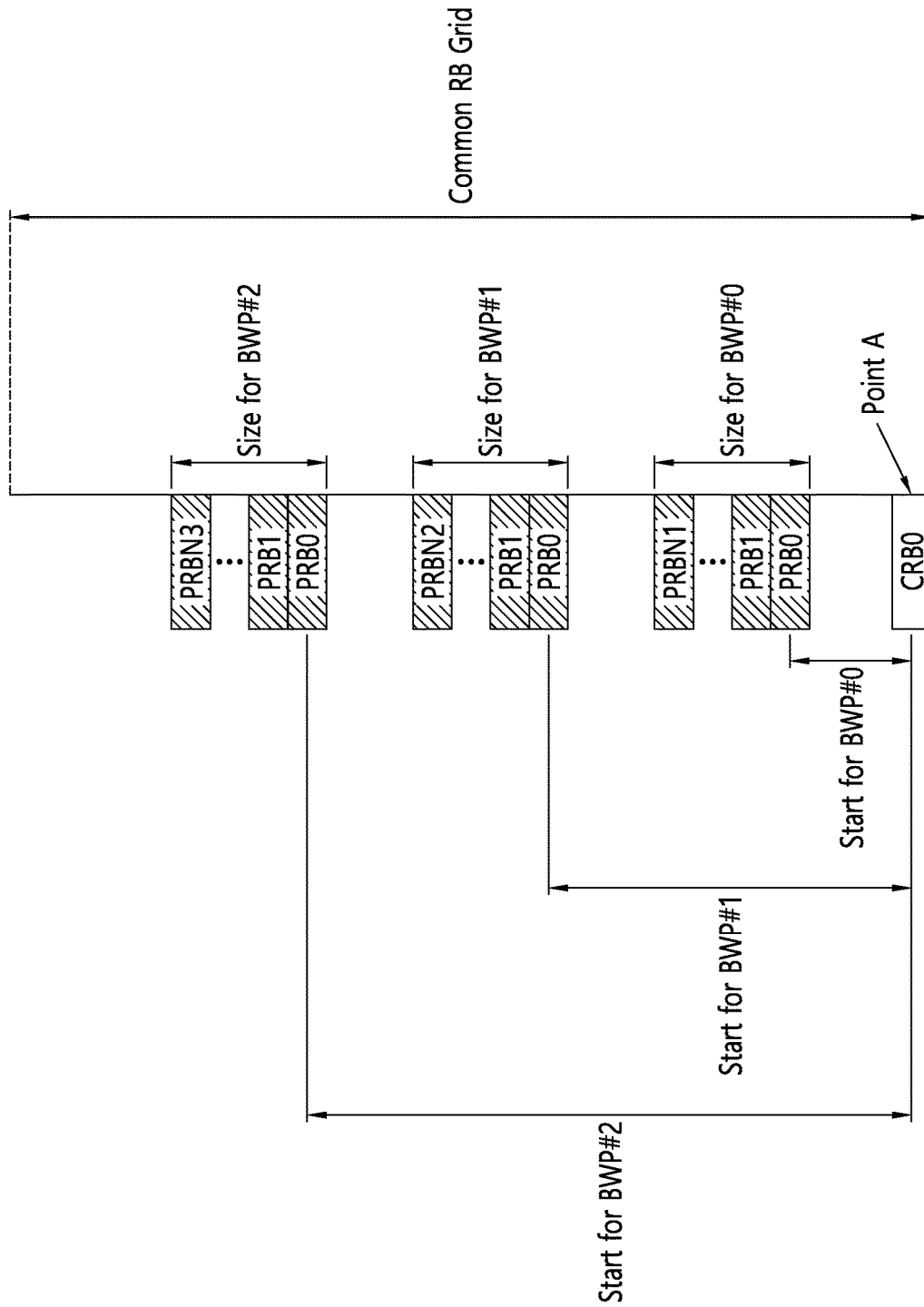
FIG. 8 shows an example of a frequency allocation scheme to which technical features of the present invention can be applied.

FIG. 8 shows an example of a frequency allocation scheme to which technical features of the present invention can be applied.

Referring to FIG. 8, multiple BWPs may be defined in the CRB grid. A reference point of the CRB grid (which may be referred to as a common reference point, a starting point, etc.) is referred to as so-called "point A" in NR. The point A is indicated by the RMSI (i.e. SIB1). Specifically, the frequency offset between the frequency band in which the SS/PBCH block is transmitted and the point A may be indicated through the RMSI. The point A corresponds to the center frequency of the CRB0. Further, the point A may be a point at which the variable "k" indicating the frequency band of the RE is set to zero in NR. The multiple BWPs shown in FIG. 8 is configured to one cell (e.g. primary cell (PCell)). A plurality of BWPs may be configured for each cell individually or commonly.

Referring to FIG. 8, each BWP may be defined by a size and starting point from CRB0. For example, the first BWP, i.e. BWP #0, may be defined by a starting point through an offset from CRB0, and a size of the BWP #0 may be determined through the size for BWP #0.

A specific number (e.g. up to four) of BWPs may be configured for the UE. Even if a plurality of BWPs are configured, only a specific number (e.g. one) of BWPs may be activated per cell for a given time period. However, when the UE is configured with a supplementary uplink (SUL) carrier, maximum of four BWPs may be additionally configured on the SUL carrier and one BWP may be activated for a given time. The number of configurable BWPs and/or the number of activated BWPs may be configured commonly or individually for UL and DL. Also, the numerology and/or CP for the DL BWP and/or the numerology and/or CP for the UL BWP may be configured to the UE via DL signaling. The UE can receive PDSCH, PDCCH, channel state information (CSI) RS and/or tracking RS (TRS) only on the active DL BWP. Also, the UE can transmit PUSCH and/or physical uplink control channel (PUCCH) only on the active UL BWP.

Figure 9:
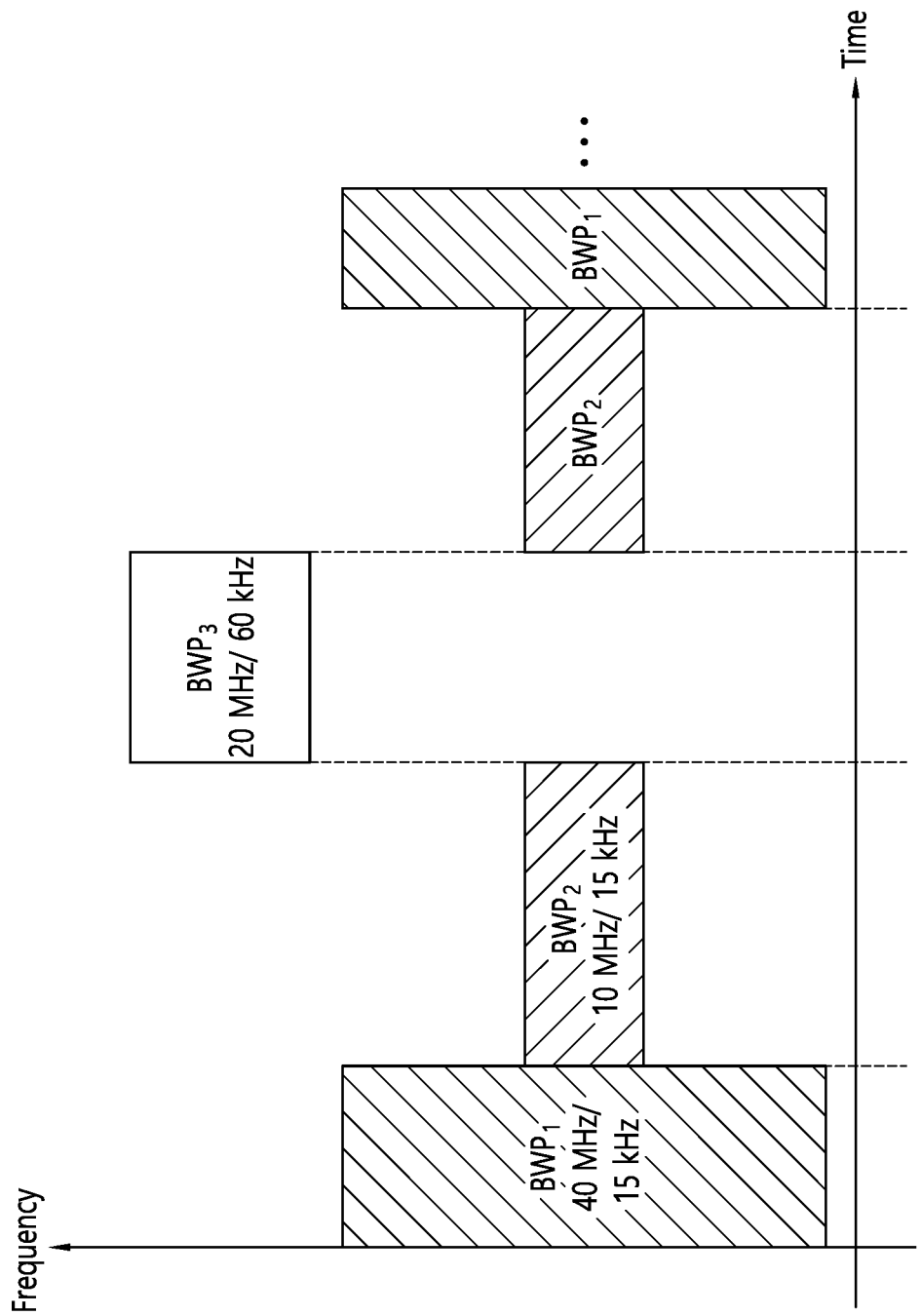
FIG. 9 shows an example of multiple BWPs to which technical features of the present invention can be applied.

FIG. 9 shows an example of multiple BWPs to which technical features of the present invention can be applied.

Referring to FIG. 9, 3 BWPs may be configured. The first BWP may span 40 MHz band, and a subcarrier spacing of 15 kHz may be applied. The second BWP may span 10 MHz band, and a subcarrier spacing of 15 kHz may be applied. The third BWP may span 20 MHz band and a subcarrier spacing of 60 kHz may be applied. The UE may configure at least one BWP among the 3 BWPs as an active BWP, and may perform UL and/or DL data communication via the active BWP.

A time resource may be indicated in a manner that indicates a time difference/offset based on a transmission time point of a PDCCH allocating DL or UL resources. For example, the start point of the PDSCH/PUSCH corresponding to the PDCCH and the number of symbols occupied by the PDSCH/PUSCH may be indicated.

Carrier aggregation (CA) is described. Like LTE/LTE-A, CA can be supported in NR. That is, it is possible to aggregate continuous or discontinuous component carriers (CCs) to increase the bandwidth and consequently increase the bit rate. Each CC may correspond to a (serving) cell, and each CC/cell may be divided into a primary serving cell (PSC)/primary CC (PCC) or a secondary serving cell (SSC)/secondary CC (SCC).

Figure 10:
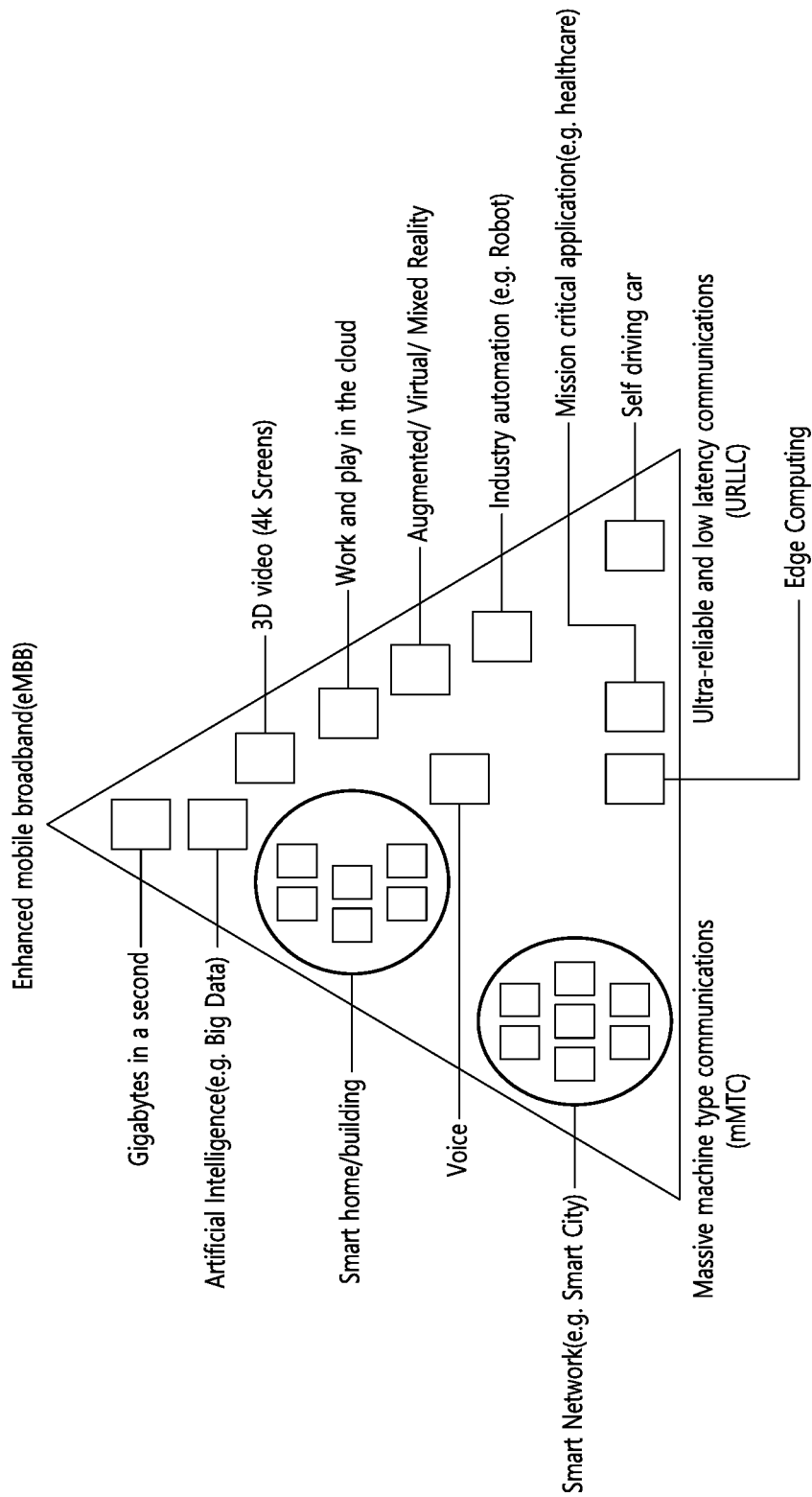
FIG. 10 shows examples of 5G usage scenarios to which the technical features of the present invention can be applied.

FIG. 10 shows examples of 5G usage scenarios to which the technical features of the present invention can be applied. The 5G usage scenarios shown in FIG. 10 are only exemplary, and the technical features of the present invention can be applied to other 5G usage scenarios which are not shown in FIG. 10.

Referring to FIG. 10, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 10 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 11:
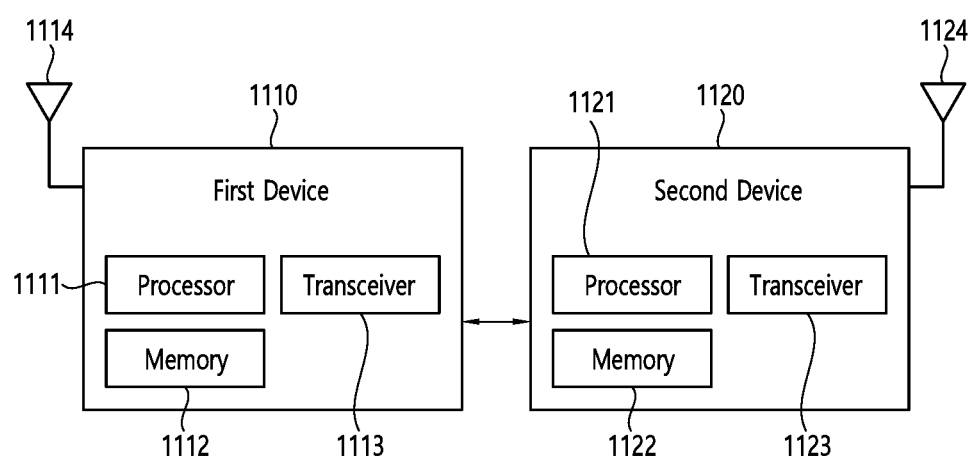
FIG. 11 shows an example of a wireless communication system to which the technical features of the present invention can be applied.

FIG. 11 shows an example of a wireless communication system to which the technical features of the present invention can be applied.

Referring to FIG. 11, the wireless communication system may include a first device 1110 and a second device 1120.

The first device 1110 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 1120 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 1110 may include at least one or more processors, such as a processor 1111, at least one memory, such as a memory 1112, and at least one transceiver, such as a transceiver 1113. The processor 1111 may perform the functions, procedures, and/or methods of the present invention described below. The processor 1111 may perform one or more protocols. For example, the processor 1111 may perform one or more layers of the air interface protocol. The memory 1112 is connected to the processor 1111 and may store various types of information and/or instructions. The transceiver 1113 is connected to the processor 1111 and may be controlled to transmit and receive wireless signals.

The second device 1120 may include at least one or more processors, such as a processor 1121, at least one memory, such as a memory 1122, and at least one transceiver, such as a transceiver 1123. The processor 1121 may perform the functions, procedures, and/or methods of the present invention described below. The processor 1121 may perform one or more protocols. For example, the processor 1121 may perform one or more layers of the air interface protocol. The memory 1122 is connected to the processor 1121 and may store various types of information and/or instructions. The transceiver 1123 is connected to the processor 1121 and may be controlled to transmit and receive wireless signals.

The memory 1112, 1122 may be connected internally or externally to the processor 1111, 1121, or may be connected to other processors via a variety of technologies such as wired or wireless connections.

The first device 1110 and/or the second device 1120 may have more than one antenna. For example, antenna 1114 and/or antenna 1124 may be configured to transmit and receive wireless signals.

Hereinafter, the PUCCH resource will be described in detail. For this, reference may be made to Section 9.2.1 of 3GPP TS 38.213 V15.1.0 (2018-03).

An uplink control information (UCI) type being reported in PUCCH includes hybrid automatic repeat request (HARQ)-ACK, scheduling request (SR), and channel state information (CSI). A UCI bit includes an HARQ-ACK information bit (if present), an SR information bit (if present), and a CSI bit (if present).

If the UE does not have a dedicated PUCCH resource configuration being provided by a higher-layer parameter PUCCH-Resource-Set, initial active UL BWP for PUCCH transmission having HARQ-ACK information is indicated by SystemInformationBlockType1, and the PUCCH resource set is provided by via a higher-layer parameter PUCCH-Resource-Common via SystemInformationBlockType1. The PUCCH resource set includes a PUCCH format, a first symbol, and a duration for the PUCCH transmission. The UE transmits a PUCCH by using frequency hopping. The UE transmits a PUCCH by using the same spatial domain transmission filter as an Msg3 PUCCH transmission. The UE is not expected to generate more than one HARQ-ACK information bits.

In case the UE has a dedicated PUCCH resource configuration, the UE is provided with one or more of the following higher-layer parameters by a higher layer.

PUCCH-format0 providing resource for PUCCH transmission in PUCCH format 0;

PUCCH-format1 providing resource for PUCCH transmission in PUCCH format 1;

PUCCH-format2 providing resource for PUCCH transmission in PUCCH format 2;

PUCCH-format3 providing resource for PUCCH transmission in PUCCH format 3;

PUCCH-format4 providing resource for PUCCH transmission in PUCCH format 4.

The PUCCH resource includes one or more of the following parameters.

(1) Index of a First Symbol

In case of PUCCH format 0 or PUCCH format 2, the index of the first symbol is indicated by a higher-layer parameter PUCCH-F0-F2-starting symbol.

In case of PUCCH format 1, PUCCH format 3, or PUCCH format 4, the index of the first symbol is indicated by a higher-layer parameter PUCCH-F1-F3-F4-starting-symbol.

(2) Number of Symbols

In case of PUCCH format 0 or PUCCH format 2, the number of symbols is indicated by a higher-layer parameter PUCCH-F0-F2-number-of-symbols.

In case of PUCCH format 1, PUCCH format 3, or PUCCH format 4, the number of symbols is indicated by a higher-layer parameter PUCCH-F1-F3-F4-number-of-symbols.

(3) Index of a First PRB Prior to Frequency Hopping, or in a Case Where There is No Frequency Hopping by a Higher-Layer Parameter PUCCH-Starting-PRB (4) Index of a First PRB After Frequency Hopping by a Higher-Layer Parameter PUCCH-2nd-Hop-PRB (5) Number of PRBs (In Case of PUCCH Format 2 or PUCCH Format 3)

In case of PUCCH format 2, the number of PRBs is indicated by a higher-layer parameter PUCCH-F2-number-of-PRBs.

In case of PUCCH format 3, the number of PRBs is indicated by a higher-layer parameter PUCCH-F3-number-of-PRBs.

(6) Frequency Hopping: Frequency Hopping for the PUCCH Resource may be Enabled or Disabled and may be Indicated by a Higher-Layer Parameter PUCCH-Frequency-Hopping.

(7) Index of a Cyclic Shift (In Case of PUCCH Format 0 or PUCCH Format 1): The Index of the Cyclic Shift is Indicated by a Higher-Layer Parameter PUCCH-F0-F1-Initial-Cyclic-Shift.

(8) Index of an Orthogonal Cover Code in Case of PUCCH Format 1: The Index of the Orthogonal Cover Code is from a Determined Set and is Indicated by a Higher-Layer Parameter PUCCH-F1-Time-Domain-OCC.

(9) Index of an Orthogonal Cover Code in Case of PUCCH Format 4

The index of an orthogonal cover code is from a set of {0, 1, 2, 3} and is indicated by a higher-layer parameter PUCCH-F4-preDFT-OCC-index.

(10) Spreading Factor for an Orthogonal Cover Code in Case of PUCCH Format 4: The Spreading Factor of PUCCH Format 4 is from a Set of {2, 4} and is Indicated by a Higher-Layer Parameter PUCCH-F4-PreDFT-OCC-Length.

(11) In Case a Single Value is Provided for a Higher-Layer Parameter Spatialrelationinfo, a Spatial Configuration is Provided by a Higher-Layer Parameter PUCCH-Spatialrelationinfo; Otherwise, the Spatial Configuration is Provided by a Select Command for a Value of Spatialrelationinfo.

The UE may be configured with multiple PUCCH configuration sets by a higher-layer parameter PUCCH-Resource-Set. A number of PUCCH resources within a first set of PUCCH resources is provided by a higher-layer parameter maxNrofPUCCH-ResourcesPerSet. The number of PUCCH resources within another set of PUCCH resources is equal to 8. The PUCCH resources within a PUCCH resource set are indicated by a higher-layer parameter PUCCH-ResourceId.

If the UE transmits $N_{UCI}$ number of UCI bits, the UE determines the PUCCH resource set as described below:

if $N_{UCI} \leq 2$, a first set of PUCCH resources, or if $2 < N_{UCI} < N_2$ (wherein $N_2$ is provided by a higher-layer parameter N_2), a second set of PUCCH resources (if present), or if $N_2 \leq N_{UCI} < N_3$ (wherein $N_3$ is provided by a higher-layer parameter N_3), a third set of PUCCH resources (if present), or if $N_3 \leq N_{UCI} \leq N_4$, a fourth set of PUCCH resources (if present).

If the UE transmits UCI instead of transmitting PUSCH, the UE transmits UCI according to the following PUCCH formats.

PUCCH format 0: in case transmission is performed in 1 symbol or 2 symbols, and in case the number of UCI bits is equal to 1 or 2, PUCCH format 1: in case transmission is performed in 4 symbols or more, and in case the number of UCI bits is equal to 1 or 2, PUCCH format 2: in case transmission is performed in 1 symbol or 2 symbols, and in case the number of UCI bits is equal to 2 or more, PUCCH format 3: in case transmission is performed in 4 symbols or more, and in case the number of UCI bits is equal to 2 or more, PUCCH format 4: in case transmission is performed from 4 symbols or more, in case the number of UCI bits is equal to 2 or more, and in case the PUCCH resource includes an orthogonal cover code.

Hereinafter, the QCL and/or transmission configuration indication (TCI) will be described in detail. For this, reference may be made to Section 5.1.5 of 3GPP TS 38.214 V15.1.0 (2018-03).

If the characteristic of a channel carrying a symbol of one antenna port can be deduced from a channel carrying a symbol of another antenna port, it can be said that the two antenna ports are in a QCL relationship.

In order to decode a PDSCH according to a detected PDCCH having a DCI intended for the UE and a given serving cell, the UE may be configured with up to M number of TCI-States via higher-layer signaling. Herein, the value M depends upon the UE capability. Each of the configured TCI-States includes one RS set TCI-RS-SetConfig. Each TCI-RS-SetConfig includes a parameter for configuring a QCL relationship between a reference signal within the RS set and a DM-RS port group of the PDSCH. The RS set includes a reference for one DL RS or two DL RSs and an associated QCL type associated for each DL RS being configured by a higher-layer parameter QCL-Type. In case there are two DL RSs, the QCL type shall not be the same for both DL RSs, regardless of whether the DL RSs have the same reference or have different reference standards. The QCL type being indicated to the UE is based on a higher-layer parameter QCL-Type and may select one of the following types or a combination of two or more of the following types.

QCL-TypeA': {Doppler shift, Doppler spread, Average delay, Delay spread}

QCL-TypeB': {Doppler shift, Doppler spread}

QCL-TypeC': {Average delay, Doppler shift}

QCL-TypeD': {Spatial reception parameter}

More specifically, the fact that two signals are in a QCL relationship indicates the following.

(1) The two signals have undergone very similar channel conditions.

(2) In order for the two signals to undergo similar channel conditions, it is highly likely that the two signals are located at the same position (i.e., the same location and the same antenna).

(3) Since the two signals reach the receiver via similar channels, if the receiver is capable of detecting one of the signals and understanding the channel characteristics of the corresponding signal, it will be significantly advantageous for detecting other signals.

The UE receives activation commands being used for mapping a maximum of 8 TCI states to code points of a Transmission Configuration Indication field of the DCI. After the UE receives an initial higher-layer configuration of the TCI state, and before the UE receives an activation command, the UE may assume that an antenna port of a DM-RS port group of a PDSCH within a serving cell is spatially in a QCL relationship with an SS/PBCH block, which is determined in an initial access procedure, for Doppler shift, Doppler spread, Average delay, Delay spread, and Spatial Reception parameter.

If the UE is configured with a higher-layer parameter TCI-PresentInDCI, which is set to 'Enabled' for a CORESET that schedules a PDSCH, the UE assumes that a TCI field exists in a DL DCI of a PDCCH that is transmitted from the corresponding CORESET. If the TCI-PresentInDCI is set to 'Disabled' for the CORESET that schedules the PDSCH, or if the PDSCH is scheduled by DCI format 1_0, in order to determine a PDSCH antenna port QCL, the UE assumes that the TCI state for the PDSCH is the same as the TCI state that is applied for the CORESET, which is used for the PDCCH transmission.

If the TCI-PresentInDCI is set to 'Enabled', the UE uses the TCI-States in accordance with a value of a Transmission Configuration Indication field included in the DCI of the PDCCH, which is detected for determining PDSCH antenna port QCL. If a time offset between a DL DCI reception and a corresponding PDSCH is equal to or greater than a threshold value Threshold-Sched-Offset, the UE may assume that an antenna port of a DM-RS port group of a PDSCH of a serving cell is in a QCL relationship with an RS included in an RS set for a QCL type, which is given by a TCI state. The threshold value is based on the UE capability. In case of both TCI-PresentInDCI='Enabled' and TCI-PresentInDCI='Disabled', if the time offset between a DL DCI reception and a corresponding PDSCH is less than the threshold value Threshold-Sched-Offset, the UE may assume that an antenna port of a DM-RS port group of a PDSCH of a serving cell is in a QCL relationship based on a TCI state, which is used for a PDCCH QCL indication of a lowest CORESET-ID in a last slot having one or more CORESETs configured therein for the UE. If all of the configured TCI states to not include QCL-TypeD', the UE shall acquire a QCL assumption that is different from a TCI state being indicated for a scheduled PDSCH, regardless of a time offset between a DL DCI reception and a corresponding PDSCH.

In the NR, single beam and/or multi-beam operations may be performed. A network may position a single beam and/or multiple beams, and different single beams may be used at different time points. Regardless of whether a single beam operation is being performed or a multi-beam operation is being performed, for the UE, resource that is intended to perform monitoring for control channel monitoring needs to be determined. Most particularly, if a multi-beam operation is performed, or if repetition is used, the same control channel may be transmitted at different occasions. This is also the same for a UL transmission. Additionally, in case a RACH procedure may be performed within an active DL/UL BWP configured for a UE, physical random access channel (PRACH) resource for a physical random access channel (PRACH) preamble transmission may be independently configured for each UL BWP. In case different UL BWPs are used between UEs, how the PUCCH resources are being configured needs to be clarified. Additionally, when a fallback message is scheduled so as to switch an ACK/NACK codebook mechanism or an RRC reconfiguration, etc., a more robust ACK/NACK transmission mechanism may also be considered. In association with a QCL/TCI state of a PUCCH resource, various cases need to be considered. More specifically, beam failure cases, beam failure recovery cases, new RACH procedures, etc., may need to be considered, and, in such cases, a mechanism for determining the QCL/TCI state needs to be clarified.

Hereinafter, PUCCH resource configuration and/or related UE operations according to an exemplary embodiment of the present invention will be described in detail. The PUCCH resource configuration and/or related UE operations according to the exemplary embodiment of the present invention may be described mostly based on a PUCCH transmission in an initial DL/UL BWP of a PCell/primary SCell (PSCell). However, the present invention will not be limited only to this, and, in association with the PUCCH resource configuration and/or related UE operations according to the exemplary embodiment of the present invention, the following cases may be additionally considered.

(1) PUCCH Transmission After RRC Connection Establishment in the Initial DL/UL BWP of a PCell/PSCell (2) PUCCH Transmission for an ACK/NACK Corresponding to an Msg4 in an Active DL/UL BWP that is Different from the Initial DL/UL BWP of a PCell/PSCell (3) PUCCH Transmission for a Fallback ACK/NACK in the Initial DL/UL BWP (4) PUCCH Transmission for a Fallback ACK/NACK in an Active DL/UL BWP that is Different from the Initial DL/UL BWP (5) PUCCH Transmission for an ACK/NACK Corresponding to an Msg4, During SCell RACH Procedures in the Initial DL/UL BWP (6) PUCCH Transmission for an ACK/NACK Corresponding to an Msg4, During SCell RACH Procedures in an Active DL/UL BWP that is Different from the Initial DL/UL BWP RMSI may configure PUCCH resource from the 16 available PUCCH resource sets that are used in the initial access procedure. This may be referred to as a default PUCCH resource set. After establishing an RRC connection, the UE may be configured with another set of PUCCH resources. This may be referred to as a UE-dedicated PUCCH resource set. The UE may use the default PUCCH resource set and/or the UE-dedicated PUCCH resource set in accordance with any one of the following options.

(1) Option 1: The default PUCCH resource set may be used only before the RRC connection establishment. After the RRC connection establishment, the UE may use the UE-dedicated PUCCH resource set at all times. More specifically, after the RRC connection establishment (or after the PUCCH resource configuration), the UE may use the UE-dedicated PUCCH resource set even for an ACK/NACK transmission corresponding to an Msg4 in the initial DL/UL BWP. In other words, an ACK/NACK corresponding to a temporary cell radio network temporary identifier (C-RNTI) based PDSCH may be transmitted by using the default PUCCH resource set, whereas another ACK/NACK may be transmitted by using the UE-dedicated PUCCH resource set.

(2) Option 2: The default PUCCH resource set may be used for the RACH procedure (e.g. ACK/NACK for Msg4), the beam failure recovery procedure, and the fallback ACK/NACK. The fallback ACK/NACK may be defined as a case where the UE receives only DL assignment index (DAI)=1 in a fallback DCI of a PCell without other DCIs.

(3) Option 3: The default PUCCH resource set may be used before the RRC connection establishment or in a RACH procedure before the UE-dedicated PUCCH resource set is available for usage, and the default PUCCH resource set may also be used for the fallback ACK/NACK. In the other cases, the UE-dedicated PUCCH resource set may be used. This is to ensure that the ACK/NACK for the fallback operation is transmitted via robust resource.

(4) Option 4: The default PUCCH resource set may be used for the RACH procedure regardless of whether or not the RRC connection is established. The UE-dedicated PUCCH resource set may be used for other cases, such as fallback ACK/NACK, a beam failure recovery procedure, and so on.

(5) Option 5: The UE-dedicated PUCCH resource set may be used in all cases excluding the RACH procedure. SpatialTxinformation of the PUCCH may be implicitly determined for the RACH procedure. More specifically, during the RACH procedure, the SpatialTxinformation of the PUCCH resource may be disregarded.

(6) Option 6: SpatialTx information of a lowest PUCCH resource may be determined based only on the RACH procedure. The SpatialTx information of the lowest PUCCH resource may be configured without any explicit configuration. Alternatively, in case the lowest PUCCH resource is not configured with an explicit SpatialTxinformation, the SpatialTx information may be determined based on the RACH procedure. The same operation may also be applied to a PUCCH resource that does not have an explicit SpatialTx configuration.

(7) Option 7: SpatialTx information of a lowest PUCCH resource may be determined based on the RACH procedure or media access control (MAC) control element (CE). The SpatialTx information may not be configured without an explicit configuration. However, in case it is assumed that the state of the configured SpatialTx information is equal to at least one of the an SS/PBCH block set, a beam recovery RS set, and a radio link monitoring (RLM)-RS set if a beam correspondence is assumed, scheduling request indicator (SRI)/sounding reference signal (SRS) resource sets if a beam correspondence is not assumed, the SpatialTx information may be activated via MAC CE. Alternatively, in case the lowest PUCCH resource is not configured with an explicit SpatialTxinformation, the SpatialTx information may be determined based on the most recent one of the RACH procedure and the MAC CE. In other words, the SpatialTx information of the PUCCH resource may be updated based on the most recent one of the RACH procedure and MAC CE.

In case of the above-described Option 2, the following additional options may be considered for a UE-dedicated UL BWP scenario, or a RACH procedure of an SCell, or a fallback ACK/NACK transmission of an SCell.

Option 1: In the above-described case, also, a default PUCCH resource set of a PCell (or PSCell) may be used. In order to support this, a default PUCCH resource set needs to be configured for each UE-specific BWP that does not include a UL BWP. RMSI signaling may be re-used, and an offset may be applied to a virtual UL BWP, which is used for Msg3 transmission within the corresponding UL BWP.

Option 2: In the above-described case, the UE-dedicated PUCCH resource set may be used at all times.

This may also be applied to the case of the above-described Option 3. More specifically, a fallback ACK/NACK for each cell may be transmitted by using the default PUCCH resource set, or the fallback ACK/NACK for a non-PCell or non-PSCell cell may be transmitted by using the UE-dedicated PUCCH resource set.

The QCL/TCI state for each PUCCH resource set may be as described below. In the following description, the QCL/TCI state may be substituted by SpatialTX information.

Default PUCCH resource set: The QCL/TCI state of the default PUCCH resource set may follow a beam direction that is used for the transmission of an Msg3 (or PRACH preamble) of a most recently performed RACH procedure. In case the QCL/TCI state of the default PUCCH resource set follows the Msg3, the QCL/TCI state of the default PUCCH resource set may be updated based on a contention-based RACH procedure. In case the QCL/TCI state of the default PUCCH resource set follows the PRACH preamble, the QCL/TCI state of the default PUCCH resource set may be updated based on the RACH procedure regardless of whether the RACH procedure corresponds to a contention-based RACH procedure or a non-contention based RACH procedure.

UE-dedicated PUCCH resource set: When available, the QCL/TCI state of the UE-dedicated PUCCH resource set may follow an indicated SRI. Otherwise, the QCL/TCI state of the UE-dedicated PUCCH resource set may follow a QCL/TCI state that is configured to a lowest PUCCH resource. Alternatively, the QCL/TCI state of the UE-dedicated PUCCH resource set may follow a QCL/TCI state of the default PUCCH resource set. Similarly to the QCL/TCI state of the default PUCCH resource set, the RACH procedure may update the QCL/TCI state of the UE-dedicated PUCCH resource set. Since the RACH procedure may occur as a contention-based procedure or a non-contention based procedure, the QCL/TCI state of the UE-dedicated PUCCH resource set may follow a PRACH of a most recently successful RACH procedure including a beam failure recovery procedure. Alternatively, SpatialTx information of part of the PUCCH resource set may not be configured, and the corresponding PUCCH resource set may follow a recent RACH procedure in order to determine the SpatialTx information. If an Msg3 of the RACH procedure is used for determining the QCL/TCI state of the UE-dedicated PUCCH resource set, a QCL/TCI state for a PUSCH transmission in an Msg3 or beam failure recovery procedure (after performing PUSCH re-transmission or receiving RAR after receiving a beam failure recovery response) may follow the QCL/TCI state of a PRACH preamble, which is transmitted for the beam failure recovery.

Alternatively, an explicit QCL/TCI state may be given for a UE-dedicated PUCCH resource set (or per PUCCH resource). At this point, the QCL/TCI state may be updated only explicitly by a reconfiguration via RRC or MAC CE or DCI. Until the explicit reconfiguration, the previously configured QCL/TCI state may be used. In this case, during the RACH procedure or beam failure recovery procedure, the default PUCCH resource set, in which the QCL/TCI state may be changed in accordance with the RACH procedure, may be used. In other words, a UE-dedicated PUCCH resource set having no explicit SpatialTx information may be allowed. The SpatialTx information of the UE-dedicated PUCCH resource set may be determined based on a recent PACH procedure. In case a beam correspondence is assumed, the SpatialTx information of the UE-dedicated PUCCH resource set may be determined based on an SS/PBCH block index being used in RAR/Msg4. In case a beam correspondence is not assumed, the SpatialTx information of the UE-dedicated PUCCH resource set may be determined based on a RACH resource, in which RACH/Msg4/HARQ-ACK corresponding to the Msg4 is aligned during the RACH procedure.

When a RACH resource having no SpatialTx information (i.e. a RACH resource that is not explicitly configured), the UE may be expected to use only DAI=1 or 1 bit or 2 bits of HARQ-ACK bit (or a specific PUCCH format set). When needed, the HARQ-ACK bit or CSI bit may be omitted so as to be suitable for 1-2 bits of the HARQ-ACK.

Figure 12:
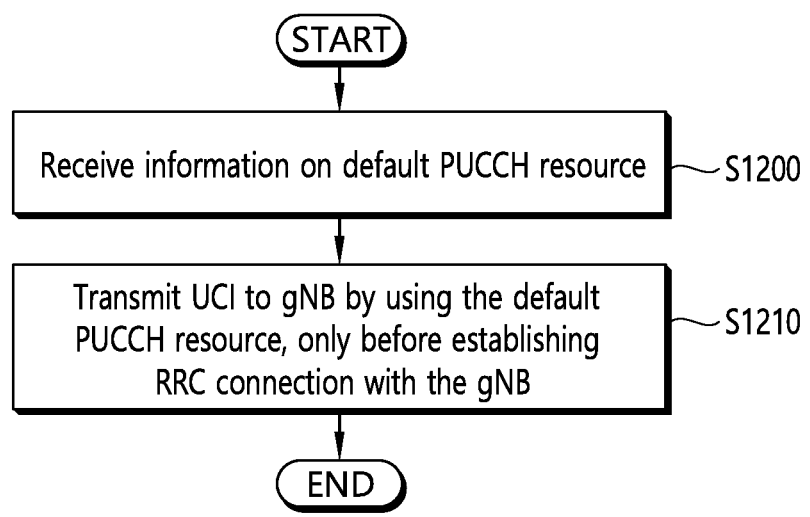
FIG. 12 shows an example of a method for transmitting a UCI according to an exemplary embodiment of the present invention.

FIG. 12 shows an example of a method for transmitting a UCI according to an exemplary embodiment of the present invention. The above-described embodiment of the present invention may be applied to this embodiment. Most particularly, in association with the usage of the default PUCCH resource set and the UE-dedicated PUCCH resource set, Option (1) may be applied.

Referring to FIG. 12, in step S1200, a UE receives information on a default PUCCH resource. The information on the default PUCCH resource may be received via RMSI. The information on the default PUCCH resource may be configured by an PUCCH-ConfigCommon information element (IE), which is included in the RMSI. The PUCCH-ConfigCommon IE may be used for configuring a cell-specific PUCCH parameter. The information on the default PUCCH resource may correspond to a pucch-Resource-Common field within the PUCCH-ConfigCommon IE. The default PUCCH resource may correspond to one of the 16 PUCCH resources.

In step S1210, only before establishing an RRC connection with a gNB, the UE transmits UCI to the gNB by using the default PUCCH resource. More specifically, the UE uses the default PUCCH resource only during an initial access procedure within an initial UL BWP.

The UCI may include an HARQ-ACK corresponding to a temporary C-RNTI based PDSCH transmission.

The QCL/TCI state or SpatialTx information for the default PUCCH resource may be determined based on a beam direction that is used for a PRACH preamble transmission during a most recently performed random access procedure. At this point, the TCI state for the default PUCCH resource may be updated based on a contention-based random access procedure or a non-contention based random access procedure. Alternatively, the TCI state for the default PUCCH resource may be determined based on a beam direction that is used for a Msg3 transmission during a most recently performed random access procedure. At this point, the TCI state for the default PUCCH resource may be updated based on a contention-based random access procedure.

The UE may receive information on a UE-dedicated PUCCH resource. When the UE receives the UE-dedicated PUCCH resource, the UE may use the UE-dedicated PUCCH resource instead of the default PUCCH resource. After establishing an RRC connection with the gNB, the UE may transmit the UCI to the gNB by using the UE-dedicated PUCCH resource.

The TCI state for the UE-dedicated PUCCH resource may be explicitly configured by the gNB. At this point, the TCI state for the UE-dedicated PUCCH resource may be updated only by an explicit reconfiguration performed by the gNB. Alternatively, the TCI state for the UE-dedicated PUCCH resource may be determined based on a PRACH preamble transmission in a most recent successfully performed random access procedure.

According to the exemplary embodiment of the present invention that is described with reference to FIG. 12, when and/or for which operation the default PUCCH resource is being used can be clearly defined. Additionally, regarding the default PUCCH resource and/or the UE-dedicated PUCCH resource, before receiving the information on the QCL/TCI state, the QCL/TCI state for the corresponding PUCCH resource can be clearly defined.

Figure 13:
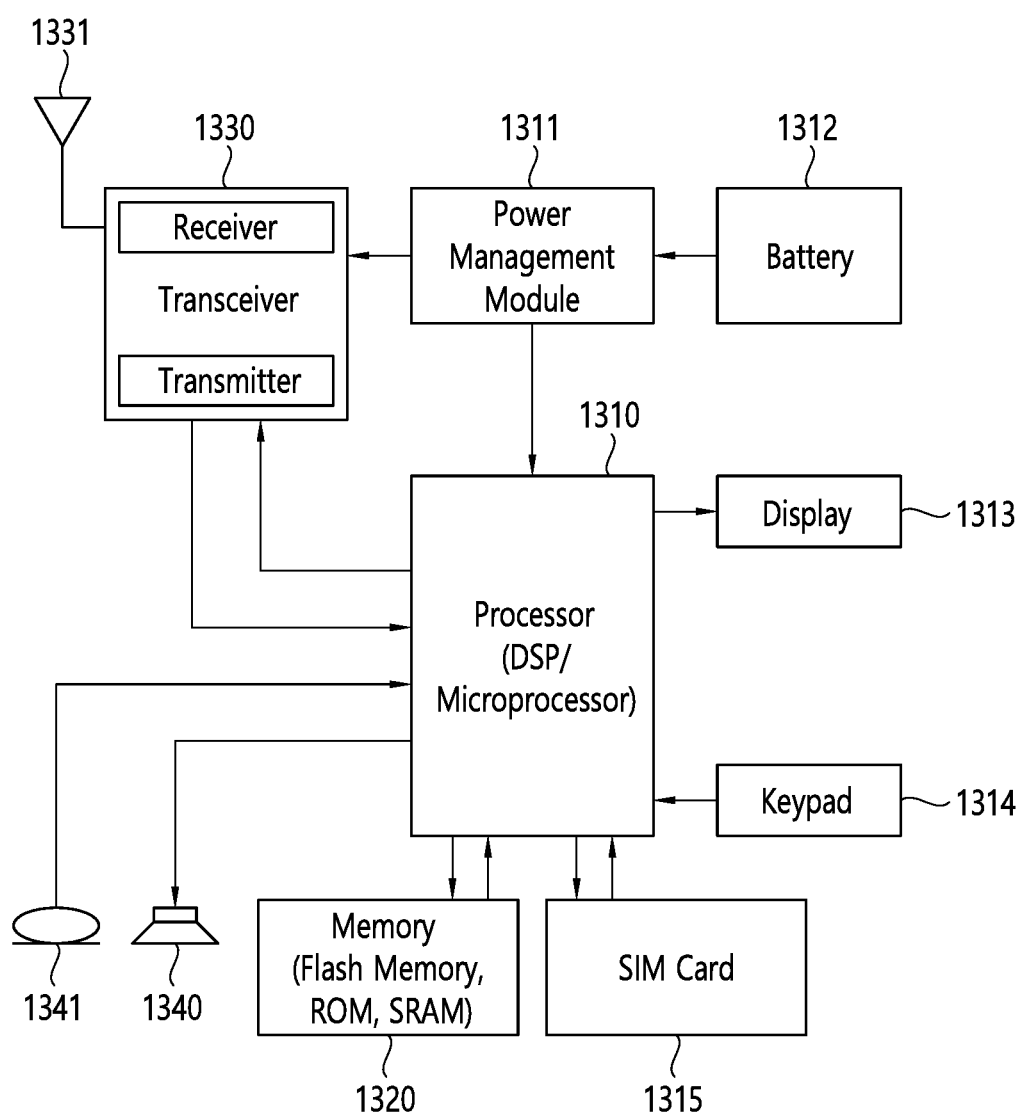
FIG. 13 shows more detailed UE to implement an embodiment of the present invention. The present invention described above for UE may be applied to this embodiment.

FIG. 13 shows more detailed UE to implement an embodiment of the present invention. The present invention described above for UE may be applied to this embodiment.

A UE includes a processor 1310, a power management module 1311, a battery 1312, a display 1313, a keypad 1314, a subscriber identification module (SIM) card 1315, a memory 1320, a transceiver 1330, one or more antennas 1331, a speaker 1340, and a microphone 1341.

The processor 1310 may be configured to implement proposed functions, procedures and/or methods described in this description. Layers of the radio interface protocol may be implemented in the processor 1310. The processor 1310 may include ASIC, other chipset, logic circuit and/or data processing device. The processor 1310 may be an application processor (AP). The processor 1310 may include at least one of a digital signal processor (DSP), a central processing unit (CPU), a graphics processing unit (GPU), a modem (modulator and demodulator). An example of the processor 1310 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1310 may be configured to control the transceiver 1330 to receive information on a default PUCCH resource. The information on the default PUCCH resource may be received via RMSI. The information on the default PUCCH resource may be configured by an PUCCH-ConfigCommon information element (IE), which is included in the RMSI. The PUCCH-ConfigCommon IE may be used for configuring a cell-specific PUCCH parameter. The information on the default PUCCH resource may correspond to a pucch-ResourceCommon field within the PUCCH-ConfigCommon IE. The default PUCCH resource may correspond to one of the 16 PUCCH resources.

Only before establishing an RRC connection with a gNB, the processor 1310 may be configured to control the transceiver 1330 to transmit UCI to the gNB by using the default PUCCH resource. More specifically, the UE uses the default PUCCH resource only during an initial access procedure within an initial UL BWP.

The UCI may include an HARQ-ACK corresponding to a temporary C-RNTI based PDSCH transmission.

The QCL/TCI state or SpatialTx information for the default PUCCH resource may be determined based on a beam direction that is used for a PRACH preamble transmission during a most recently performed random access procedure. At this point, the TCI state for the default PUCCH resource may be updated based on a contention-based random access procedure or a non-contention based random access procedure. Alternatively, the TCI state for the default PUCCH resource may be determined based on a beam direction that is used for a Msg3 transmission during a most recently performed random access procedure. At this point, the TCI state for the default PUCCH resource may be updated based on a contention-based random access procedure.

The processor 1310 may be configured to control the transceiver 1330 to receive information on a UE-dedicated PUCCH resource. When the UE receives the UE-dedicated PUCCH resource, the UE may use the UE-dedicated PUCCH resource instead of the default PUCCH resource. After establishing an RRC connection with the gNB, the processor 1310 may be configured to control the transceiver 1330 to transmit the UCI to the gNB by using the UE-dedicated PUCCH resource.

The TCI state for the UE-dedicated PUCCH resource may be explicitly configured by the gNB. At this point, the TCI state for the UE-dedicated PUCCH resource may be updated only by an explicit reconfiguration performed by the gNB. Alternatively, the TCI state for the UE-dedicated PUCCH resource may be determined based on a PRACH preamble transmission in a most recent successfully performed random access procedure.

The power management module 1311 manages power for the processor 1310 and/or the transceiver 1330. The battery 1312 supplies power to the power management module 1311. The display 1313 outputs results processed by the processor 1310. The keypad 1314 receives inputs to be used by the processor 1310. The keypad 1314 may be shown on the display 1313. The SIM card 1315 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1320 is operatively coupled with the processor 1310 and stores a variety of information to operate the processor 1310. The memory 1320 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 1320 and executed by the processor 1310. The memory 1320 can be implemented within the processor 1310 or external to the processor 1310 in which case those can be communicatively coupled to the processor 1310 via various means as is known in the art.

The transceiver 1330 is operatively coupled with the processor 1310, and transmits and/or receives a radio signal. The transceiver 1330 includes a transmitter and a receiver. The transceiver 1330 may include baseband circuitry to process radio frequency signals. The transceiver 1330 controls the one or more antennas 1331 to transmit and/or receive a radio signal.

The speaker 1340 outputs sound-related results processed by the processor 1310. The microphone 1341 receives sound-related inputs to be used by the processor 1310.

According to the exemplary embodiment of the present invention that is described with reference to FIG. 13, when and/or for which operation the default PUCCH resource is being used can be clearly defined. Additionally, regarding the default PUCCH resource and/or the UE-dedicated PUCCH resource, before receiving the information on the QCL/TCI state, the QCL/TCI state for the corresponding PUCCH resource can be clearly defined.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a wireless device in a wireless communication system, comprising:
    transmitting first uplink control information (UCI) to a network using a default physical uplink control channel (PUCCH) resource before a radio resource control (RRC) connection for the wireless device is established; and
    transmitting second UCI to the network using a user equipment (UE)-dedicated PUCCH resource after the RRC connection for the wireless device is established,
    wherein the default PUCCH resource is unused after the RRC connection is established,
    wherein a transmission using the default PUCCH resource is based on a beam used for a physical uplink shared channel (PUSCH) transmission scheduled by a random access response in a random access procedure, and wherein a transmission using the UE-dedicated PUCCH resource is based on a beam that is explicitly indicated to the wireless device via a configuration by the network.

2. The method of claim 1, further comprising:
receiving a physical downlink shared channel (PDSCH) transmission from the network, wherein the first UCI includes a hybrid automatic repeat request (HARQ)-acknowledgement (ACK) corresponding to the PDSCH transmission which is based on a temporary cell radio network temporary identifier (C-RNTI).

3. The method of claim 1, further comprising:
receiving remaining minimum system information (RMSI) comprising information on the default PUCCH resource.

4. The method of claim 1, further comprising:
transmitting a physical random access channel (PRACH) preamble during one or more random access procedures using a beam direction; and
determining a transmission configuration indicator (TCI) state for the default PUCCH resource based on a beam direction used for transmission of the PRACH preamble during a most recent random access procedure among the one or more random access procedures.

5. The method of claim 4, further comprising:
updating the TCI state for the default PUCCH resource based on a contention-based random access procedure or a non-contention based random access procedure.

6. The method of claim 1, further comprising receiving information on a UE-dedicated PUCCH resource.

7. The method of claim 1, wherein the wireless device communicates with at least one of a mobile terminal, a network, or an autonomous vehicle other than the wireless device.

8. The method of claim 1, further comprising:
updating a transmission configuration indicator (TCI) state for the default PUCCH resource based on a contention-based random access procedure.

9. The method of claim 1, further comprising:
receiving, from the network, an explicit reconfiguration for updating a transmission configuration indicator (TCI) state for the UE-dedicated PUCCH resource.

10. A wireless device in a wireless communication system, comprising:
a memory;
a transceiver; and
at least one processor operatively connected to the memory and the transceiver,
wherein the at least one processor is configured to:
control the transceiver, to transmit first uplink control information (UCI) to a network using a default physical uplink control channel (PUCCH) resource before a radio resource control (RRC) connection for the wireless device is established; and
control the transceiver to transmit second UCI to the network using a user equipment (UE)-dedicated PUCCH resource after the RRC connection for the wireless device is established,
wherein the default PUCCH resource is unused after the RRC connection is established,
wherein a transmission using the default PUCCH resource is based on a beam used for a physical uplink shared channel (PUSCH) transmission scheduled by a random access response in a random access procedure, and
wherein a transmission using the UE-dedicated PUCCH resource is based on a beam that is explicitly indicated to the wireless device via a configuration by the network.

11. A processor for a wireless device in a wireless communication system, wherein the processor is configured to:
control the wireless device so as to transmit first uplink control information (UCI) to a network using a default physical uplink control channel (PUCCH) resource before a radio resource control (RRC) connection for the wireless device is established; and
control the wireless device so as to transmit second UCI to the network using a user equipment (UE)-dedicated PUCCH resource after the RRC connection for the wireless device is established,
wherein the default PUCCH resource is unused after the RRC connection is established,
wherein a transmission using the default PUCCH resource is based on a beam used for a physical uplink shared channel (PUSCH) transmission scheduled by a random access response in a random access procedure, and
wherein a transmission using the UE-dedicated PUCCH resource is based on a beam that is explicitly indicated to the wireless device via a configuration by the network.

* * * * *